Dec. 24, 1940.    A. MOORHOUSE    2,226,010
CHAIN DRIVE
Filed Sept. 28, 1938    2 Sheets-Sheet 1
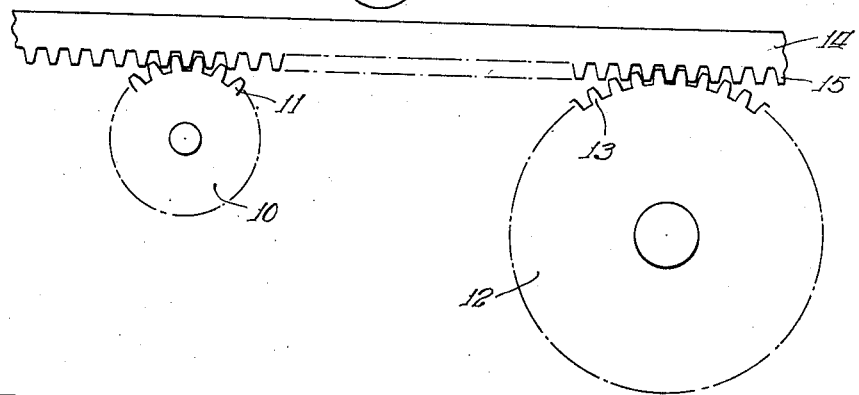
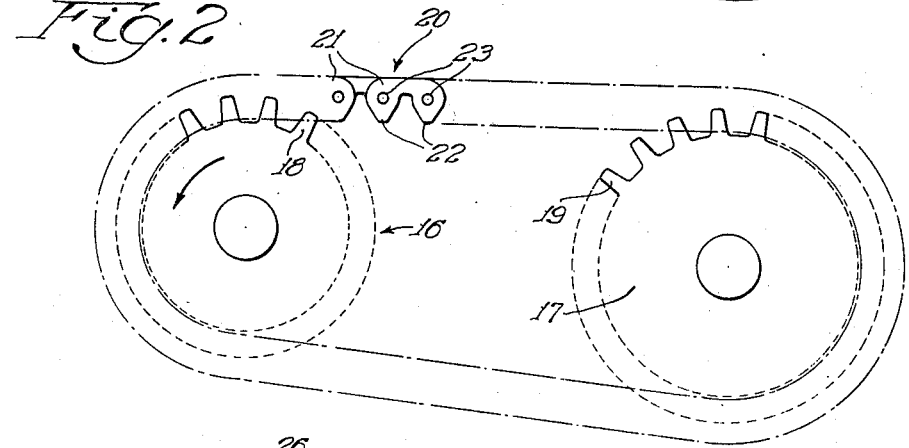
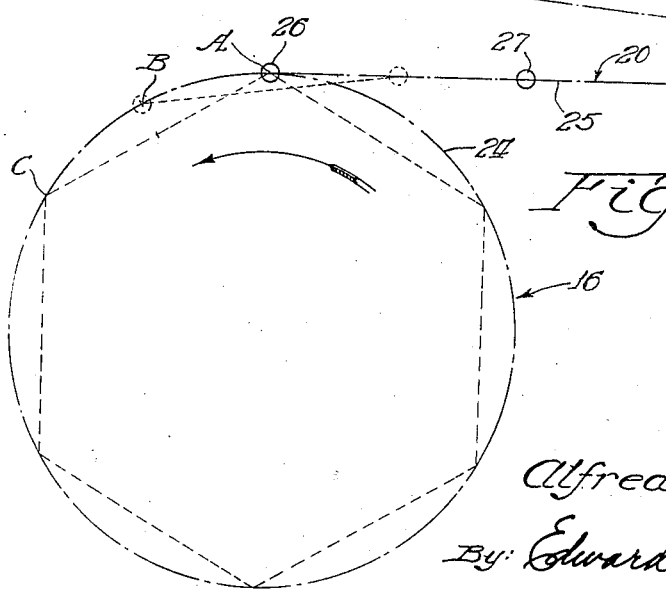
Inventor:
Alfred Moorhouse.
By: Edward P. Gritzbaugh
Atty.

Dec. 24, 1940.   A. MOORHOUSE   2,226,010
CHAIN DRIVE
Filed Sept. 28, 1938   2 Sheets-Sheet 2

Inventor:
Alfred Moorhouse.
By: Edward C. Gritzbaugh
Atty.

Patented Dec. 24, 1940

2,226,010

UNITED STATES PATENT OFFICE 2,226,010

CHAIN DRIVE

Alfred Moorhouse, Detroit, Mich., assignor to Morse Chain Company, Ithaca, N. Y., a corporation of New York Application September 28, 1938, Serial No. 232,021

7 Claims. (Cl. 74—250)

This invention relates to chain drives, and particularly to that type of chain drive wherein the chain is comprised of a series of toothed links connected by pivot pins.

The object of this invention is to provide a chain drive in which the chain moves at a constant linear velocity and the driven sprocket rotates at a constant angular velocity when the angular velocity of the driving sprocket is constant.

Another object of this invention is to provide a chain which eliminates chordal action.

Another object of this invention is to provide a chain such that the hobbing equipment for generating sprocket teeth to cooperate therewith may be used for cutting any number of teeth from a predetermined minimum to infinity.

These and other objects of the invention will become apparent from the following description when taken together with the accompanying drawings, and in which Fig. 1 illustrates the ideal chain action;

Fig. 2 shows a driving sprocket, a driven sprocket and an endless chain cooperating therewith;

Fig. 3 is an enlarged view of the pitch circle of the driving sprocket showing the various positions of a chain link as it is being wound upon the sprocket;

Figure 4:
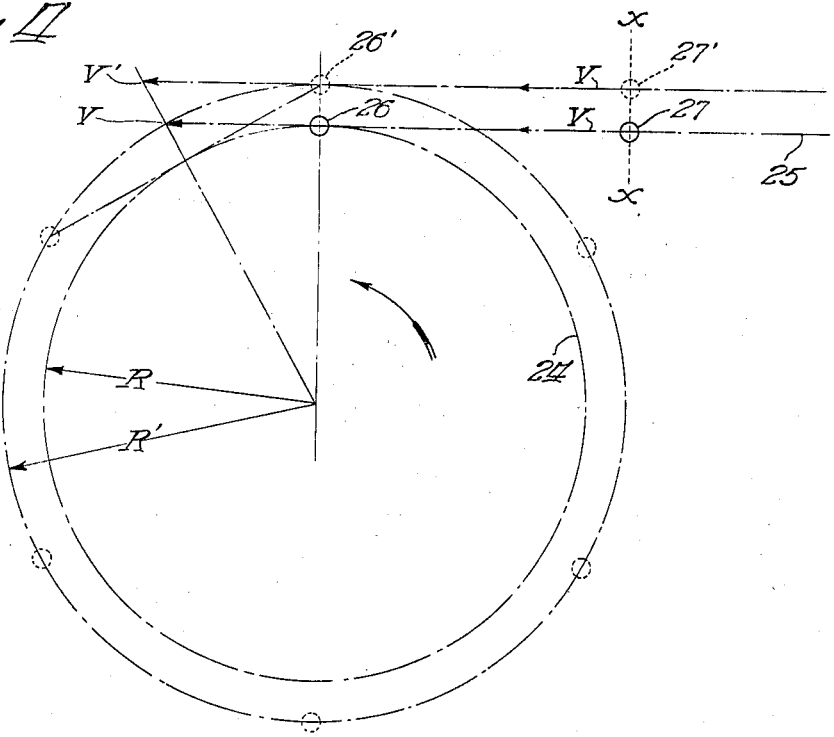
Fig. 4 is a velocity diagram of a chain and sprocket.

Broadly speaking, this invention takes into consideration the fact that a link changes its direction as it enters a sprocket, and because of this condition, the velocity of the trailing pivot will vary if the velocity of the leading pivot is constant, and vice versa. It is also contemplated by this invention that the teeth of the sprocket shall be generated from a rack having the same pressure angle and straight side profile as the chain which is to cooperate with the sprockets.

Referring first to Fig. 1, there is shown a driving sprocket 10 having teeth 11, a driven sprocket 12 having teeth 13, and a rack 14 of infinite length having teeth 15 cooperating with teeth 11 and 13. It is well known that substantially uniform rotation may be transmitted from the driving sprocket 10 to the driven sprocket 12 if the involute system of gear cutting is used. By this system, teeth 15 of rack 14 are made straight sided with a predetermined pressure angle, and the teeth of driving sprocket 10 and driven sprocket 12 are then cut from a hob having a profile of rack 14. If rack 14 is of infinite length, then driving sprocket 10 can drive driven sprocket 12 as long as is desired.

It is impossible to get a rack of infinite length in practice. It is, nevertheless, frequently desired to drive two or more parallel and widely separated shafts with a positive action. This may be done by the well known chain and sprocket drive.

Referring now to Fig. 2, there is shown a sprocket 16, which may be considered the driving sprocket, and a driven sprocket 17 having teeth 18 and 19, respectively. Wrapped around both sprockets is an endless chain 20 which is comprised of a plurality of individual links 21 having teeth 22 on the inner surface thereof, and connected together by means of pins 23. It is obvious that the portion of chain 20 located between the sprockets and commonly called the strand, resembles rack 14 of Fig. 1.

Prior to this invention, it had been customary to design teeth 22 of link 21 with reference to a particular sprocket, so that the tooth action varied with the number of teeth in the sprocket. According to this invention, however, teeth 22, insofar as the sides of the teeth are concerned, are given the contour of teeth 15 of rack 14, that is, teeth 22 are made straight-sided, the angle of the sides being determined from the sprocket having the minimum number of teeth which is to cooperate therewith. I have found that the minimum pressure angle to be used in the tooth profile design is preferably 25 degrees. Teeth 18 and 19, although appearing on sprockets of different diameters, may be cut with the same hobbing equipment, because of the rack design of chain 20, and the use of the involute system in designing the profiles of teeth 22.

It is apparent that the chain and sprocket design of Fig. 2 will permit driving sprocket 16 to drive driven sprocket 17 as long as desired. Whether or not the velocity of the chain and the driven sprocket will be constant if the driving sprocket velocity is constant however, depends upon a number of factors, some of which heretofore have not been considered.

In the enlarged view of the pivot circle 24 of sprocket 16, and the line of pivots 25 of chain 20, it will be observed that when leading pivot pin 26 reaches the point of tangency between the line of pivots 25 and pivot circle 24, its direction of movement is changed from a rectilinear movement to a curvilinear movement along pivot circle 24. While leading pivot pin 26 is following a curvilinear movement, however, trailing pivot pin 27 is still following a rectilinear movement along the line of pivot pin centers 25. Thus, if the curvilinear velocity of point 26 remains constant while it is following arc A, B, C, the linear velocity of trailing pivot pin 27 will vary above and below that of pivot pin 26, due to the articulation or angularity of the link with respect to the line of pivot pin centers 25. If, therefore, the pivot pins in the strand are to travel at a uniform and constant velocity, the leading pivot pins must travel at a varying velocity while pursuing the curvilinear path. This varying chain velocity exists throughout the entire curvilinear movement, since the trailing pivot pin must assume the velocity of the leading pivot pin when said trailing pivot pin commences its curvilinear movement. The trailing pivot pin at that time becomes the leading pivot pin as to the succeeding pin, and this action continues as long as the sprocket and chain are operating together.

It can be proven mathematically that the curvilinear velocity of leading pivot pin 26 is variable when the strand velocity is uniform, since the angle that the pivot makes with respect to line 25 varies from zero to the angle at which trailing pivot pin 27 reaches the point of tangency A. For a small angle, however, the variation in curvilinear velocity is greatly reduced. The sprocket shown in Fig. 3 has but six teeth, which is a great deal less than is normally found on a sprocket, and therefore, the conditions shown in Fig. 3 are extreme.

The usual practice in designing involute teeth is to form the teeth with reference to a particular circle which may be called the pitch circle. In the case of meshing gear teeth, the pitch circles of the gears are tangent, and represent the cylinders which would give pure rolling action with the same angular velocity ratio as is given by the gear teeth. In a chain and sprocket drive, the pitch circle of the sprocket may be similarly defined as that circle any part of which travels at the same linear velocity as the chain in the strand cooperating therewith, so that by reference to the linear velocity of the strand and the angular velocities of the driving and driven sprockets, the diameters of the pitch circles may be determined.

Referring now to Fig. 4, pitch circle 24 is shown tangent to line 25, said circle 24 and line 25 representing a series of points which travel at exactly the same linear velocity, i. e., circle 24 is the pitch circle of the sprocket. This velocity may be indicated by a vector V. Since the strand travels in a straight line, it is obvious that any point along a line X—X perpendicular to line 25 travels at the same velocity V. It is also obvious that any point along line 25 and pitch circle 24 travels at velocity V, but that any point along a radial line R travels with a linear velocity which is proportional to the radial distance of the point from the center of rotation. For example, if pivot pins 26 and 27 be moved outward parallel to pivot pin line 25, as shown at 26' and 27', but with pitch circle 24 continuing to move this parallel line at velocity V, 26' will begin to move at a greater velocity V' than 26, but 27' will be moving at the same velocity as 27. Thus, by choosing a suitable radius R', the leading pivot pin may be given a varying curvilinear velocity which is different from and greater than the velocity of the trailing pivot pin by an amount which is sufficient to cause the trailing pivot pin to move at a constant linear velocity when the leading pivot pin is moving along a curved line. Radius R' is therefore preferably such that the chord formed by the line connecting adjacent pivot pins subtends the same arc as a point on pitch circle 24, which travels a distance equal to the distance between pivot pins.

It is apparent from the foregoing discussion that the velocity of the strand between sprockets will not be altered by the shift in the location of the pivot pins, since the velocity of the strand is controlled by the contour of the teeth and this in turn is controlled by the pitch circle.

In accordance with this invention, it is intended that driving contact between the chain and sprocket teeth shall be limited to that portion of the chain that is coming on the sprocket, i. e., to the angles of approach and recess, in order to eliminate the effect of the variable velocity of the leading pivot as it assumes a curvilinear movement. To effect such a limitation in the contact between the chain and sprocket teeth, a clearance C is provided in the chain near the tips of the sprocket teeth. This clearance C (Fig. 5), however, together with the usual clearances between the faces of the teeth and the bottom of the dedendum deprive the chain of resistance to any inward forces which might cause it to be displaced inwardly from its theoretical position.

To counteract inward forces, the usual clearance between the bottoms of the teeth on the sprocket and the tips of the teeth on the chain may be eliminated so that the teeth of the chain actually contact the sprocket between the teeth thereof. By this means, the teeth may be held in their proper radial relation with respect to the sprocket, and the pins likewise maintained on the desired radius.

Figure 5:
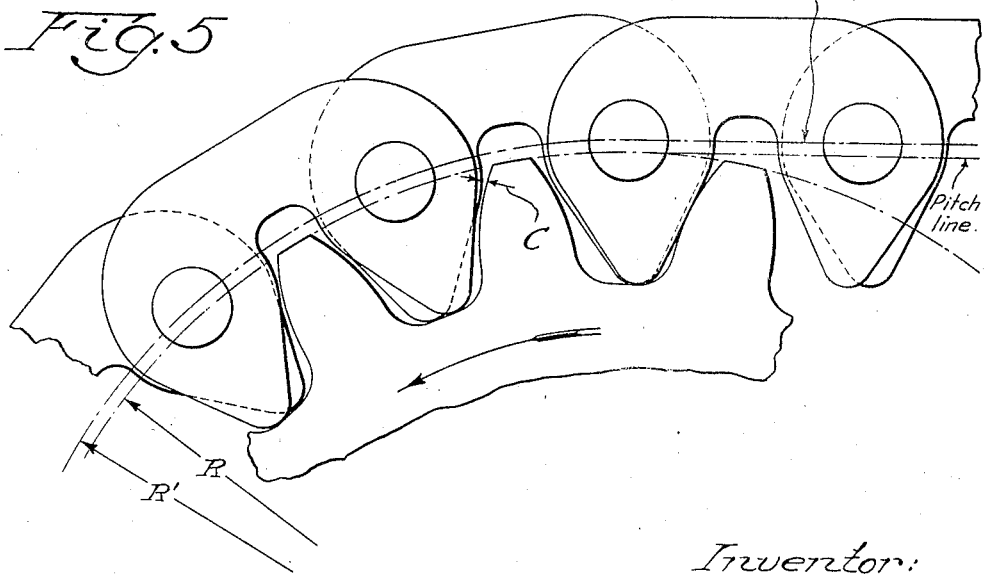
Fig. 5 shows a portion of a sprocket and chain designed in accordance with this invention.

A sprocket and chain with one of the links in the strand shown in full are shown in Fig. 5. The customary clearance or backlash between the teeth of the chain and sprocket is provided so as to compensate for minute manufacturing inaccuracies. Additional clearance C is provided, as stated above, in order to make driving contact between the chain and sprocket impossible except during the interval when the chain is coming on or leaving the sprocket. This clearance will likewise serve to permit the links to slide circumferentially relative to the sprocket in accordance with velocity variations occurring therebetween. The bottoming of the ends of the chain teeth on the sprocket to prevent undesirable inward movement is clearly illustrated in Fig. 5.

It will be seen that the sides of the teeth are straight in accordance with this invention, and that the strand, therefore, resembles in profile a rack of the involute system.

It is apparent from the foregoing that since the articulation of the chain links has been compensated for, the strand between sprockets will move with constant linear velocity if the driving sprocket is driven at a constant angular velocity, and similarly the driven sprocket will be rotated at a constant angular velocity, since its driver, the strand, is moving at a constant linear velocity. It is apparent likewise from the foregoing, that the same action is obtained, but in the reverse direction, as a chain leaves a sprocket, and that the leading pivot pin assumes the speed of the strand between sprockets, the linear velocity of said strand being uniform.

It is understood that the foregoing is merely illustrative of the preferred embodiment of my invention, and I do not intend that the scope of the invention be limited thereto, but that it be determined by the appended claims.

I claim:

1. In combination a chain and a sprocket cooperating therewith, said chain being comprised of toothed links, and pivot pins between the links, the pivot pin of a link which is describing a curvilinear path traveling at a greater average linear velocity than the pivot pin of said link which is describing a rectilinear path substantially to compensate for the difference in length between a chord equal to the distance between pivot pins on a link and the arc said chord subtends, all pins describing the same curvilinear path traveling at substantially the same average linear velocity, and means for maintaining the pivot pins at a predetermined radius from the center of rotation of the sprocket.

2. A combination as described in claim 1, said pivot pins being located outside the pitch circle of the sprocket and entering the sprocket along a line parallel to a tangent to the pitch circle.

3. A combination as described in claim 1, said means comprising extensions on the teeth of the links whereby the ends of said teeth contact the sprocket between adjacent sprocket teeth.

4. A combination as described in claim 1, said pivot pins being located outside the pitch circle of the sprocket and entering the sprocket along a line parallel to a tangent to the pitch circle, and said means comprising extensions on the teeth of the links whereby the ends of said teeth contact the sprocket between adjacent sprocket teeth.

5. As a new article of manufacture, a toothed chain comprising links having straight-sided teeth, the ends of said teeth being extended and having working surfaces thereon, and pivot pins in said chain connecting adjacent links, said pivot pins being on a line parallel to the pitch line of the chain and on the side of said pitch line opposite these teeth.

6. In combination, a sprocket having teeth generated from a hob having the toothed profile of a rack, a chain cooperating with the sprocket and comprising toothed links having the rack toothed profile of the hob from which the sprocket teeth were generated, and pivot pins connecting the links, said pins being located on a line which is tangent to a circle greater than the pitch circle of the sprocket by an amount which will compensate for the difference between the length of a chord equal to the distance between pivot pins on a link and the arc said chord subtends, whereby substantially to eliminate velocity variations in the chain.

7. As a new article of manufacture, a toothed chain having straight sided teeth corresponding to the teeth of a rack of the involute system, said chain being comprised of toothed links connected by pivot pins, the pivot pins being located on a line which is parallel to the pitch line of the chain and on the side of said pitch line opposite the teeth.

ALFRED MOORHOUSE.